Patented Aug. 22, 1939

2,170,059

UNITED STATES PATENT OFFICE 2,170,059

PROCESS FOR THE MANUFACTURE OF MERCAPTOTHIAZOLINES

Roger A. Mathes, Akron, Ohio, assignor to The B. F. Goodrich Company, New York, N. Y., a corporation of New York No Drawing. Application September 29, 1938, Serial No. 232,389

12 Claims. (Cl. 260—302)

This invention relates to an improved process for the manufacure of certain heterocyclic mercapto compounds and has particular reference to the preparation of mercaptothiazolines and mercaptopenthiazolines.

An object of the invention is to provide a new process for the manufacture of certain heterocyclic mercapto compounds, particularly mercaptothiazolines and mercaptopenthiazolines. A further object is to provide a method adapted to economical commercial manufacture whereby compounds of such classes may be obtained in high yields by means of a relatively simple, easily controlled process.

These objects are attained by making use of a new type of reaction where an amino alkyl sulfuric acid is caused to react with carbon disulfide in the presence of an alkaline material. The reaction may be represented in the following manner:

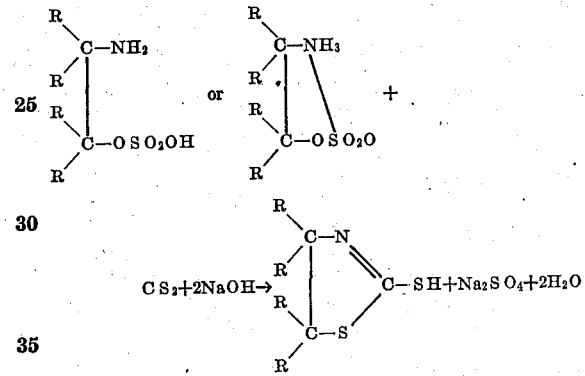

R in each case represents like or unlike radicals which may be hydrogen or a hydrocarbon group such as alkyl, aryl, substituted aryl, etc., or two R's on different carbon atoms may even be joined together to form a ring.

This process is not limited to the preparation of the five membered thiazoline ring but also includes the preparation of six or more membered heterocyclic mercapto compounds, as shown by the following formula

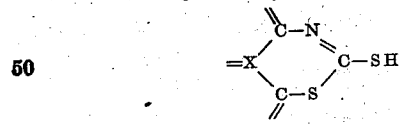

where X represents one or more carbon atoms.

This process has two distinct advantages over methods previously described. The intermediate aminoalkyl sulfuric acids are more readily prepared at a lower cost than intermediates heretofore used in the preparation of this type of compounds. The reaction with carbon disulfide has no tendency to be violent, a problem difficult to control in employing other intermediates.

While sodium hydroxide is used in the illustrative equation, the use of caustic alkali is not necessary. Milder alkaline materials, as for example, sodium carbonate, aqueous ammonia, trisodium phosphate, etc., may be used. Experimental results, however, indicate that caustic alkali or aqueous ammonia are preferable.

Water is a very satisfactory reaction diluent. The mercapto bodies formed have a low water solubility and may be filtered off. The alkali metal or ammonium sulfate by-product is discarded along with the filtrate. An alcohol as methyl alcohol, ethyl alcohol, etc., may also be used. The process is somewhat more involved where an alcohol is used by reason of the insolubility of the by-product inorganic salt and the partial solubility of the mercaptothiazoline.

Among the amino alkyl sulfuric acids that may be used in this process, 2-amino ethyl sulfuric acid is readily available by reacting ethanolamine and sulfuric acid with the application of heat. When this intermediate is employed in the new synthesis according to this invention, 2-mercaptothiazoline is formed.

Other examples of amino alkyl sulfuric acids, with the compounds synthesized are: 2-amino 1-methylethyl sulfuric acid to give 2-mercapto 5-methylthiazoline; 2-amino propyl sulfuric acid to give 2-mercapto 4-methylthiazoline; 2-amino butyl sulfuric acid to give 2-mercapto 4-ethylthiazoline; 2-amino 1-methyl propyl sulfuric acid to give 2-mercapto 4,5-dimethyl thiazoline; 2-amino 2-methyl propyl sulfuric acid to give 2-mercapto 4-dimethyl thiazoline; 2-amino 1-ethyl sulfuric acid to give 2-mercapto 4-methyl 5-ethyl thiazoline; 2-amino 1-phenyl ethyl sulfuric acid to give 2-mercapto 5-phenylthiazoline; 2-amino 2-phenylethyl sulfuric acid to give 2-mercapto 4-phenylthiazoline; 2-aminocyclohexyl sulfuric acid to give 2-mercapto 4,5-cyclotetramethylenethiazoline; 3-aminopropyl sulfuric acid to give 2-mercaptopenthiazoline (mercaptometathiazine); 3-amino 1,3-dimethyl butyl sulfuric acid to give 2-mercapto 4,4,6-trimethylpenthiazoline; 3-amino 1-methylpropyl sulfuric acid to give 2-mercapto 6-methylpenthiazoline.

The reaction is preferably carried out in a reactor provided with an agitator, a reflux condenser and a device for warming the reaction mixture such as a jacket for circulating warm water or steam.

Two molecular proportions of sodium hydroxide are dissolved in water, a 15% solution being a convenient concentration for the reaction. One molecular proportion of the aminoalkyl sulfuric acid is added and agitation is continued until solution is complete. With the temperature of this solution preferably less than 40° C., one molecular proportion of carbon disulfide is added. The mixture is agitated vigorously while warming to reflux carbon disulfide gently.

While the reaction is exothermic, there is no tendency to become violent. Carbon disulfide refluxes for a few minutes, after which the product comes down as a crystalline precipitate. Agitation is continued while cooling the reaction mixture to room temperature. The slurry is then filtered and washed with cold water. The wet filter cake is dried at room temperature.

The concentration of the water solution of amino alkyl sulfuric acid may be varied to suit the conditions of the reaction. Unless an efficient reflux condenser is provided, an excess of carbon disulfide is necessary. The reaction can also be carried out at a pressure greater than atmospheric to prevent loss of carbon disulfide. The amount of caustic alkali used should preferably closely approximate the amount stated. A deficiency tends to give a lower yield due to incomplete reaction while an excess is undesirable in that it tends to cause side reactions to take place.

The following examples describe the process more specifically, but it will be understood that the invention is not limited to these details. Wide variation in the process, amounts of reactants and in the reactants themselves are possible without materially affecting the results.

*Example 1.*—A. 25 g. of 2-amino ethyl sulfuric acid are dissolved in a solution of 14.8 g. sodium hydroxide in 60 c. c. of water. This solution is transferred to a reaction flask equipped with an agitator, a reflux condenser and a thermometer. 17 g. of carbon disulfide are added. The mixture is agitated and is warmed until carbon disulfide refluxes. In about five minutes a white, crystalline precipitate comes down. After standing for several hours the slurry is filtered, washed and dried.

The dry weight of 2-mercaptothiazoline is 19.35 g., representing a 92.6% yield. The melting point of the product is 105°–107° C.

B. The process as described in A is repeated using 200 c. c. of 95% alcohol as a diluent to replace water.

The solution is agitated whereupon the reaction takes place almost immediately without the application of heat. A heavy, finely-divided precipitate consisting of 2-mercaptothiazoline and sodium sulfate comes down.

The product is filtered off and the filter cake stirred with 200 c. c. of water to dissolve the sodium sulfate. 2-mercaptothiazoline is then filtered off, washed and dried.

More product is obtained by evaporating the alcoholic filtrate to a small volume.

The total weight of 2-mercaptothiazoline obtained is 19.7 g., representing a 94.7% yield. The melting point of the product is 105°–107° C.

*Example 2.*—A. 31 g. of 2-amino 1-methyl ethyl sulfuric acid are dissolved in a solution of 27.5 g. of concentrated aqueous ammonia and 30 c. c. of water.

This solution is transferred to a reaction flask equipped with an agitator, a reflux condenser and a thermometer. 20 g. of carbon disulfide are added.

The mixture is agitated and is warmed until carbon disulfide refluxes. The white, crystalline precipitate is somewhat slower to come down than in the case of 2-mercaptothiazoline but the precipitation may be hastened by seeding.

After standing for several hours the slurry is filtered, washer and dried. An additional amount of product is obtained by acidifying the somewhat alkaline filtrate with hydrochloric acid.

The dry weight of 2-mercapto 5-methyl thiazoline is 22.6 g. representing an 85% yield. The melting point is 91°–92° C.

B. 31 g. of 2-amino 1-methylethyl sulfuric acid are dissolved in a solution of 16.8 g. of sodium hydroxide and 300 c. c. of alcohol.

This solution is transferred to a reaction flask equipped with an agitator and a reflux condenser. 20 g. of carbon disulfide are added.

The solution is agitated and is warmed to about 65° C. A heavy, finely divided precipitate consisting of 2-mercapto 5-methylthiazoline and ammonium sulfate comes down.

The slurry is filtered and the filter cake dissolved in water. Some product is recovered from this solution, however, most of the product is in solution in the alcoholic filtrate and is recovered by evaporation.

The total weight of 2-mercaptothiazoline obtained is 25.2 g., representing a 94.7% yield. The melting point of the product is 91°–92° C.

From the data herein presented, the fact will be readily apparent that this invention constitutes an economical commercial process for the manufacture of mercaptothiazolines.

Aminoalkyl sulfuric acids, as for example, beta amino ethyl sulfuric acid, are easily prepared intermediates for this synthesis. They are available at a reasonable price. Their reaction with carbon disulfide in the presence of an alkaline material is easily controlled, involving but a short period of warming. High yields of very pure products are readily obtainable. Water as a reaction diluent serves as a solvent for the inorganic salts formed as byproducts as well as being a suspending medium from which the water insoluble mercaptothiazolines may be filtered. The crystalline nature of the product greatly facilitates filtration, permits efficient water washing of the filter cake and shortens the period of drying. Alcohol is also shown to give high yields when employed as a reaction diluent, although the recovery of product from a reaction carried out in alcohol requires somewhat more processing.

I claim:

1. A process for producing a heterocyclic mercapto compound embodying a ring consisting of at least three carbon atoms, one nitrogen atom and one sulfur atom, one carbon atom of said ring being directly between the nitrogen and sulfur atoms and joined to the sulfur of the non-nuclear mercapto-group, which comprises interacting an amino alkyl sulfuric acid in which the amino group and the sulfuric acid group are separated by from 2 to 3 carbon atoms and carbon disulfide in the presence of an alkali.

2. A process for producing a heterocyclic mercapto compound embodying a ring consisting of at least three carbon atoms, one nitrogen atom and one sulfur atom, one carbon atom of said ring being directly between the nitrogen and sulfur atoms and joined to the sulfur of the non-nuclear mercapto group, which comprises reacting an aqueous solution of an amino alkyl sulfuric acid in which the amino group and the sulfuric acid group are separated by from 2 to 3 carbon atoms and an alkali with carbon disulfide.

3. A process for producing a heterocyclic mercapto compound embodying a ring consisting of at least three carbon atoms, one nitrogen and one sulfur atom, one carbon atom of said ring being directly between the nitrogen and sulfur atoms and joined to the sulfur of the non-nuclear mercapto group, which comprises reacting carbon disulfide with a solution of an amino alkyl sulfuric acid in which the amino group and the sulfuric acid group are separated by from 2 to 3 carbon atoms and an alkali in an alcohol.

4. A process for producing a mercaptothiazoline which comprises interacting a 2-aminoalkyl sulfuric acid and carbon disulfide in the presence of an alkali.

5. A process for producing a mercaptothiazoline which comprises reacting a 2-amino alkyl sulfuric acid and carbon disulfide in the presence of a caustic alkali.

6. A process for producing a mercaptothiazoline which comprises reacting an aqueous solution of a 2-aminoalkyl sulfuric acid and an alkali with carbon disulfide.

7. A process for producing a mercaptothiazoline which comprises reacting carbon disulfide with a solution of a 2-amino alkyl sulfuric acid and an alkali in an alcohol.

8. A process for producing a mercaptothiazoline which comprises reacting an aqueous solution of substantially one molecular proportion of a 2-amino alkyl sulfuric acid and substantially two molecular proportions of a caustic alkali with substantially one molecular proportion of carbon disulfide.

9. A process for producing 2-mercaptothiazoline which comprises reacting 2-amino ethyl sulfuric acid and carbon disulfide in the presence of an alkali.

10. A process for producing 2-mercaptothiazoline which comprises reacting an aqueous solution of substantially one molecular proportion of 2-amino ethyl sulfuric acid and substantially two molecular proportions of a caustic alkali metal or ammonium hydroxide with substantially one molecular proportion of carbon disulfide.

11. A process for producing 2-mercaptothiazoline which comprises reacting in an alcohol solution substantially one molecular proportion of 2-amino ethyl sulfuric acid and substantially two molecular proportions of a caustic alkali with substantially one molecular proportion of carbon disulfide.

12. A process for producing 2-mercapto 5-methyl thiazoline which comprises reacting 2-amino 1-methyl ethyl sulfuric acid with carbon disulfide in the presence of an alkali.

ROGER A. MATHES.